United States Patent [19]
Rawlinson et al.

[11] Patent Number: 4,802,088
[45] Date of Patent: Jan. 31, 1989

[54] METHOD AND APPARATUS FOR PERFORMING A PSEUDO BRANCH IN A MICROWORD CONTROLLED COMPUTER SYSTEM

[75] Inventors: Stephen J. Rawlinson, Sunnyvale; Quang H. Nguyen, San Jose; Stephen M. Simmonds, Mountain View, all of Calif.

[73] Assignee: Amdahl Corporation, Sunnyvale, Calif.

[21] Appl. No.: 895,274

[22] Filed: Aug. 11, 1986

[51] Int. Cl.⁴ .............................................. G06F 9/22
[52] U.S. Cl. .................................................. 364/200
[58] Field of Search ............... 364/300, 200 MS File, 364/900 MS File

[56] References Cited
U.S. PATENT DOCUMENTS

| | | | |
|---|---|---|---|
| 4,546,431 | 10/1985 | Horvath | 364/200 |
| 4,551,798 | 11/1985 | Horvath | 364/200 |
| 4,586,127 | 4/1986 | Horvath | 364/200 |
| 4,670,835 | 6/1987 | Kelly et al. | 364/200 |

Primary Examiner—Raulfe B. Zache
Attorney, Agent, or Firm—Fliesler, Dubb, Meyer & Lovejoy

[57] ABSTRACT

A microword controlled computer system with an apparatus for performing a pseudo branch. The pseudo branch involves the re-execution of a selected microword in a microword register. The computer system comprises a microword register, N control stores, an apparatus for selectively transferring a microword from one of the N control stores to the microword register, an apparatus coupled to said microword register for executing each microword in said microword register and an apparatus for branching to N+1 targets wherein each one of N of said N+1 targets comprises a microword from one of said N control stores and one of said N+1 targets is a current microword in said microword register.

14 Claims, 4 Drawing Sheets

TABLE

MULTIPLICAND × MULTIPLIER = PRODUCT
121 × 10473 = 1267233

X1 = 121  X2 = 242  X3 = 363

| | AR | RR | MQR | LOOP COUNT | 9's Comp C5 | Carry C6 | Prod Neg C7 | Bypass 3rd cycle C8 |
|---|---|---|---|---|---|---|---|---|
| Setup | X | 00...0000 | 00...104730 | 5 | X | X | 0 | X |
| Cycle 1 | 363 | 00...0000 | 00...010473 | 4 | 0 | 0 | 0 | 1 |
| Cycle 2 | 363 | 00...0363 | 00...010473 | 4 | 0 | 0 | 0 | X |
| Cycle 1 | 363 | 00...0036 | 300...01057 | 3 | 1 | 1 | 1 | 1 |
| Cycle 2 | 363 | 99...9673 | 300...01057 | 3 | 0 | 0 | 1 | X |
| Cycle 1 | 242 | 99...9967 | 3300...0105 | 2 | 0 | 0 | 0 | 0 |
| Cycle 2 | 363 | 00...0209 | 3300...0105 | 2 | 0 | 0 | 0 | X |
| Cycle 3 | X | 00...0572 | 3300...0105 | 2 | 0 | 0 | 0 | X |
| Cycle 1 | X | 00...0057 | 23300...010 | 1 | 0 | 0 | 0 | 1 |
| Cycle 1 | 121 | 00...0005 | 723300...01 | 0 | 0 | 0 | 0 | 1 |
| Cycle 2 | 363 | 00...0126 | 723300...01 | 0 | 0 | 0 | 0 | X |
| Cycle 1 | X | 00...0012 | 6723300...0 | (-1) | 0 | 0 | 0 | 1 |

*******
X = don't care

FIG.—3

```
                      MULTIPLY LOOP PROGRAM LISTING
CYCLE 1
    SHIFTER-HIGH ->RR
    MULTIPLY-SELECT -> AR
        MULTIPLY-SELECT RULE
            IF MQR [56..59] = 1,4, or 9 THEN 1X
            IF MQR [56..59] = 2,5, or 8 THEN 2X
            IF MQR [56..59] = 3,6, or 7 THEN 3X
                OTHERWISE DON'T CARE
    [MQR(56..59) > 6]  -> CARRY TRIGGER C6
    [MQR(56..59) > 6]  -> NEXT-CYCLE-COMPLEMENT-PORT 1-TRIGGER C5
    [MQR(56..59) > 6]  -> PRODUCT-NEGATIVE-TRIGGER C 7
    IF [MQR(56..59) > 6] & [LOOP-COUNT > 0]
        THEN  [SHIFTER-LOW(0..55)/(0..55), MQR(52..55)+1/(56..59)
                 SHIFTER-LOW(60..63)/(60..63)]
                        ELSE SHIFTER-LOW -> MQR
    LOOP-COUNT - 1 -> LOOP-COUNT
    RIGHT 1 -> SAR
    IF 4 <= MQR(56..59) <= 6 THEN 0 ELSE 1 -> C8
    IF LOOP-COUNT = 0 THEN BRANCH TO FINISH CYCLES
        ELSE IF [MQR(56..59) = 0] OR [MQR(56..59 > 9]
            THEN RERUN CONTROLS FROM THIS MICROWORD
            ELSE CONTINUE TO NEXT MICROWORD

CYCLE 2
    ADDER-SUM -> RR
    3X  -> AR
    MQR - >MQR
    RIGHT 1  -> SAR
    PRODUCT-NEGATIVE-TRIGGER C7 -> PRODUCT-NEGATIVE-TRIGGER C7
    0  -> NEXT-CYCLE-COMPLEMENT-PORT 1-TRIGGER C5
    0  -> CARRY-TRIGGER C6
    C8 -> BRANCH
    CYCLE 1 -> ADDRESS

CYCLE 3
    ADDER-SUM -> RR
    MQR - >MQR
    RIGHT 1 -> SAR
    0 -> NEXT-CYCLE-COMPLEMENT-PORT 1-TRIGGER C5
    0 -> CARRY TRIGGER C6
    PRODUCT-NEGATIVE-TRIGGER C7 -> PRODUCT-NEGATIVE-TRIGGER C7
    1 -  BRANCH
    CYCLE 1 -> ADDRESS
```

FIG.—4

METHOD AND APPARATUS FOR PERFORMING A PSEUDO BRANCH IN A MICROWORD CONTROLLED COMPUTER SYSTEM

BACKGROUND OF THE INVENTION

1. Field of the Invention

The present invention relates to branching apparatus in a microword controlled computer system in general and, in particular, to a method and apparatus comprising a microword controlled computer system with an apparatus for selectively branching to, and thereby selecting for execution, a microword located in any one of N control stores and a microword register.

2. Description of Prior Art

A typical microword controlled computer system comprises a control store, a microword register coupled to the control store and a plurality of functional sub-units, e.g. adders, shifters, registers, etc., coupled to the microword register.

In operation, a microword in the control store is addressed, transferred out of the control store and placed in the microword register and executed. These three operations typically require three machine cycles, i.e. three clock pulses. In certain "pipelined" systems, the execution of a first microword overlaps the accessing of a second microword while the address of a third microword is set up in an address register.

In systems having two or more control stores, a branching circuit comprising a multiplexer coupled between the output of each of the control stores and the microword register is also provided. As used herein, a branch operation is defined as that operation which results in the selection for execution of one of a plurality of possible microwords.

In operation, a microword in each of the control stores is addressed and together they are provided simultaneously at corresponding inputs of the multiplexer. Thereafter, and in response to a branch control signal, one of the microwords is transferred to the microword register and executed. Once again, because a microword from each of the control stores is available to be transferred to the microword register, only three machine cycles are required to process either one of the microwords.

In conventional multiple control store systems, the operations comprising the transfer of an address to a control store address register, the transfer of a microword from a control store to the microword register and the execution of a microword in the microword register usually overlap. For example, in a two-control-store system, as one microword is being executed, a second microword, i.e. one from each of the control stores, is transferred to corresponding inputs of the multiplexer and an address, i.e. one for each of the control stores, is transferred to a corresponding address register.

Typically, each microword read from a control store includes an address field containing a branch address of a microword in another control store and a control field containing a control word. In a system comprising two control stores, A and B, control store A is said to be active when A controls the functional sub-units. Similarly, control store B is active when it is in control. Only one control store can be active at any time.

In a typical system, the branch decision is valid, i.e. active, only during the execution cycle of a previous microword. For example, in a two-control-store system comprising control stores A and B, a two-way branch is accomplished by ingating the address of both targets, i.e. a microword in each control store, into the address registers of the control stores, address registers AAR and BAR, respectively. The address of the active control store, called a fall-through address, is typically obtained by incrementing the previous address. The address of the microword in the then inactive control store, called a branch address, is obtained from the address field in the microword from the active control store. The branch decision, when it occurs, toggles a control signal controlling the multiplexer. Thus, if a branch decision is made during the execution of a microword from control store A, the next microword to be executed will be a microword from control store B which is located at the branch address which was obtained from the branch address field of the microword being executed.

In the above example, the number of control stores in the system corresponds to the number of branch paths required. That is, a two-way branch requires two control stores, a three-way branch requires three control stores, etc.

In certain applications, the number of control stores that can be made available to handle multiple branching paths is limited by cost and available space considerations. In such cases, for example, in the execution of a three-way branch in a system comprising two control stores, the branch can be carried out in two stages. In each case, however, branching to only one of the targets incurs no delay while branching to the other two targets is delayed by an additional cycle. Thus, assuming an equal probability of branching for all three targets, the average delay penalty for every three-way branch is 0.667 cycles.

SUMMARY OF THE INVENTION

In view of the foregoing, principal objects of the present invention are a method and apparatus comprising a microword controlled computer system having N control stores and a capacity for performing (N+1)-way branches to (N+1) possible targets with no delay.

In accordance with the above objects there is provided an apparatus for providing and responding to a control signal for repeating the execution of a current microword in a microword register for at least two successive cycles of operation. This operation is called a pseudo branch to distinguish it from conventional operations involving branches to targets, i.e. microwords, in control stores.

In a typical embodiment of the present invention, there is provided N control stores, N address registers, a microword register, a multiplexer, a LAST-SELECT register and a BRANCH control signal for providing branch control, and an AND gate responsive to a REPEAT control signal and a clock signal for repeating the execution of a current microword.

In operation, clock signals are used for changing the contents of the above-described registers. In the absence of BRANCH and REPEAT control signals, successive targets, i.e. microwords, from one of the N control stores are provided to the microword register for execution. When a branch to another target, i.e. a microword, in another of the control stores is required, a BRANCH control signal is generated. After the BRANCH control signal is generated, successive microwords are acquired from another control store beginning with the microword located at the address in the BRANCH address field of the currently executed microword. When the re-execution of a current microword, i.e. another target, is required, a REPEAT control signal is generated. The REPEAT control signal inhibits the clock signal to the address, LAST-SELECT and microword registers, thereby preventing a change in the contents of the registers and forcing the re-execution of the current microword. All other functional sub-units are operated in a normal fashion.

In a specific embodiment of the present invention, there is provided an apparatus for multiplying a multiplicand and a multiplier. During successive cycles of operation of the multiplication apparatus, the value of each digit in the multiplier is investigated. If the digit is a zero or a binary-coded decimal digit greater than 9 and additional digits in the multiplier remain to be investigated, a REPEAT control signal is generated. The generation of the REPEAT control signal in response to each such digit results in the re-execution of the current microword which not only avoids the delay associated with branches in the prior known apparatus described above, but actually results in a saving of a cycle of operation.

BRIEF DESCRIPTION OF THE DRAWING

The above and other objects, features and advantages of the present invention will become apparent from the following detailed description of the accompanying drawing, in which:

FIG. 3 is a table of the contents of the registers and status of the triggers in the apparatus of FIG. 2 during the multiplication of two numbers; and FIG. 4 is a program listing of the operations of the apparatus of FIG. 2.

DETAILED DESCRIPTION OF THE DRAWING

Figure 1:
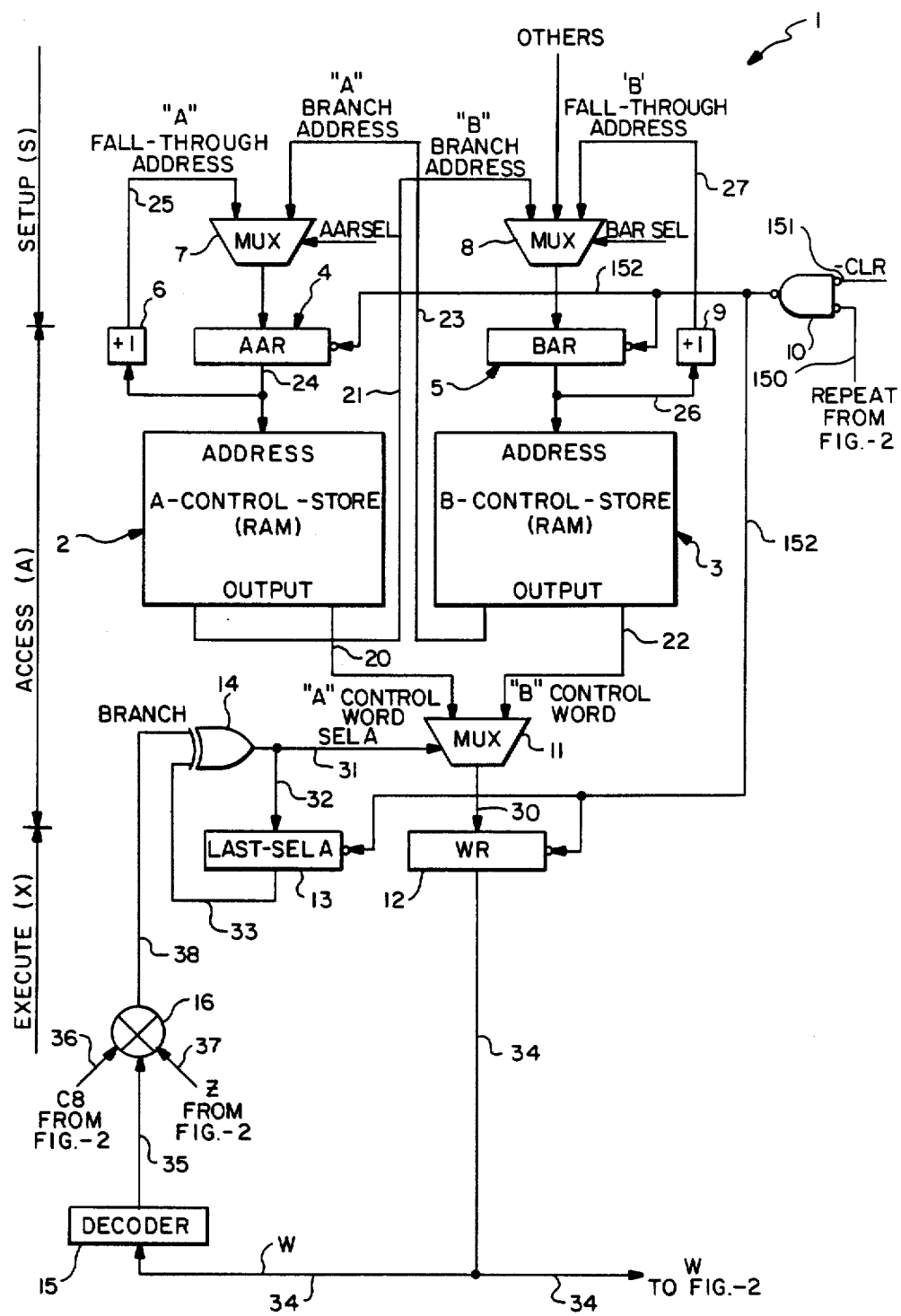
FIG. 1 is a block diagram of a portion of a two-control-store microword controlled computer system with an apparatus for performing a three-way branch operation according to the present invention.
Figure 2:
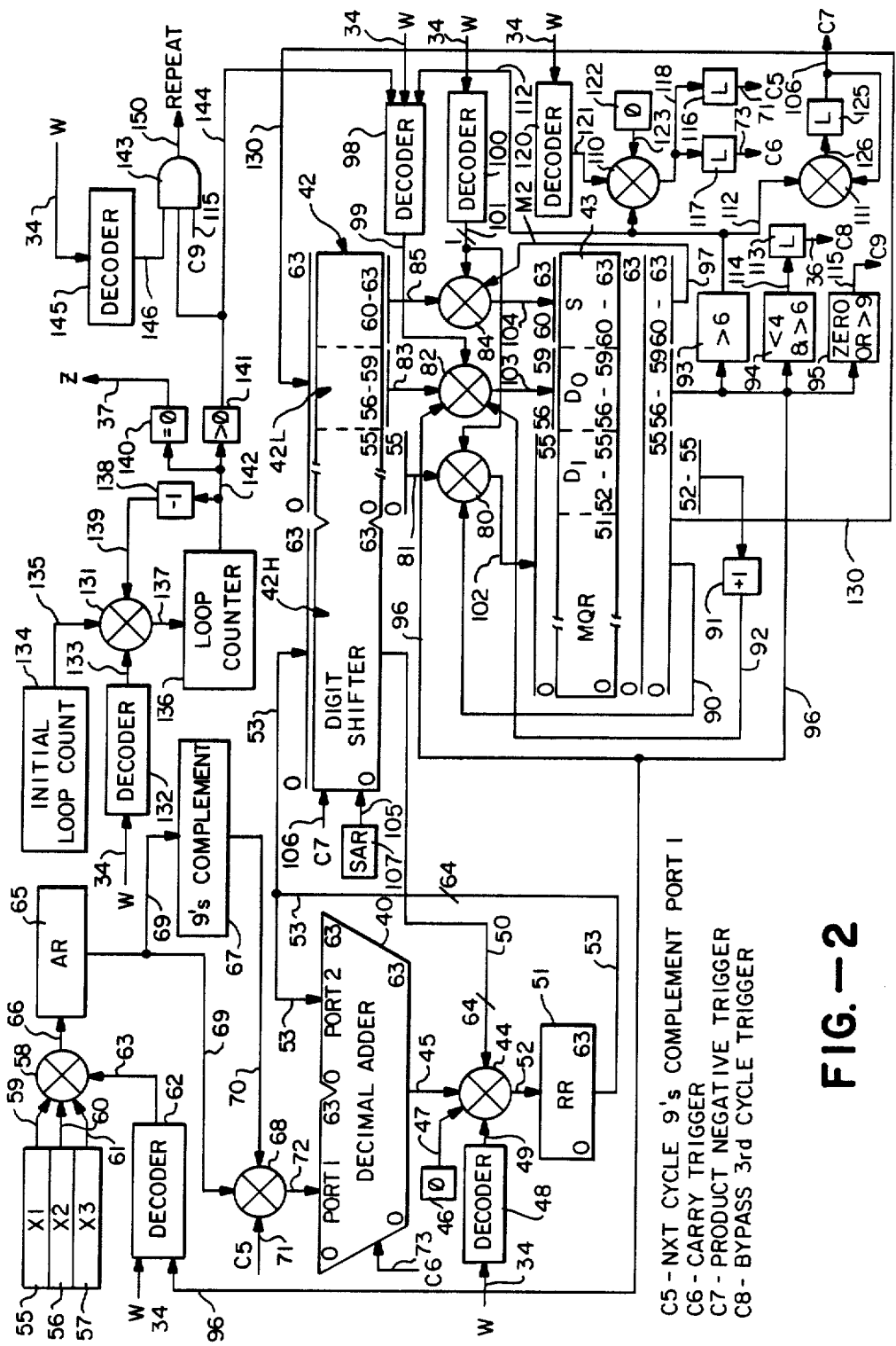
FIG. 2 is a block diagram of a portion of an arithmetic logic unit coupled to the apparatus of FIG. 1 for generating a REPEAT control signal according to the present invention.

Referring to FIGS. 1 and 2, there is provided in accordance with the present invention a microword controlled computer system designated generally as 1. In the system 1 there is provided a first control store A designated generally as 2, a second control store B designated generally as 3, an address register AAR designated generally as 4, an address register BAR designated generally as 5, a +1 incrementer 6, a multiplexer (MUX) 7, a multiplexer (MUX) 8, a +1 incrementer 9, an AND gate 10, a multiplexer (MUX) 11, a microword register (μWR) 12, a last-select-A register (LAST-SELA) 13, an exclusive OR gate 14, a decoder 15 and a multiplexer (MUX) 16.

The control stores A and B are provided for storing a plurality of microwords. In each of the microwords there is provided a branch address field and a control word. In the microwords stored in control store A, the branch address field is provided for storing branch addresses of microwords stored in the control store B. In the microwords stored in control store B, the branch address field is provided for storing branch addresses of microwords stored in the control store A.

In use, control words from the microwords stored in control store A are transferred to one input of the MUX 11 by means of a signal bus 20. At the same time, branch addresses from the same microwords are transferred to one input of the MUX 8 by means of a B branch address signal bus 21. Similarly, control words in microwords stored in control store B are transferred to another input of the MUX 11 by means of a B control word signal bus 22, while at the same time, branch addresses from the same microword are transferred to an input of the MUX 7 by means of an A branch address signal bus 23. An output of the (AAR) address register 4 is provided to the address input of the A control store 2 and to an input of the incrementer 6 by means of a bus 24. An output of the incrementer 6 is coupled to another input of the MUX 7 by means of an A fall-through address signal line bus 25.

An output of the BAR address register 5 is coupled to the address input of the B control store 3 and an input of the incrementer 9 by means of a control signal bus 26. An output of the incrementer 9 is coupled to an input of the MUX 8 by means of a B fall-through address control signal bus 27.

An output of the MUX 11 is coupled to an input of the microword register 12 by means of a signal bus 30. The output of the exclusive OR gate 14 is coupled to the control input of the MUX 11 by means of a SELA control signal bus 31 and to the LAST-SELA register 13 by means of a signal bus 32. An output of the register 13 is coupled to an input of the exclusive OR gate 14 by means of a signal bus 33. The output of the microword register 12 is coupled to the decoder 15 and, as will be further described below, to the apparatus of FIG. 2 by a control signal line 34. The output of the decoder 15 is coupled to one input of the multiplexer 16 by means of control signal bus 35. A second input of the multiplexer 16 is provided for receiving a trigger control signal C8 (bypass third cycle) from the apparatus of FIG. 2 on a control signal bus 36. Another input of the multiplexer 16 is provided for receiving a control signal Z from the apparatus of FIG. 2 on a control signal bus 37. The output of the multiplexer 16 is coupled to another input (BRANCH) of the exclusive OR gate 14 by means of a control signal bus 38.

In the apparatus of FIG. 2 there is provided a two port 64-bit decimal adder 40, a 128-bit shifter 42, and a 64-bit multiplier register (MQR) 43.

In the shifter 42 there is provided a shifter high section 42H comprising 64-bit stages 0–63 and a shifter low section 42L comprising 64-bit stages 0–63. In use, the shifter high and low sections are shifted as one continuous shift register.

An input of a multiplexer 44 is coupled to an output of the adder 40 by means of a signal bus 45. Another input of a multiplexer 44 is coupled to a source of zero digits 46 by means of a signal bus 47. Each digit comprises four decimal coded binary bits. Another input of the multiplexer 44 is coupled to a decoder circuit 48 by means of a signal bus 49. An input of the decoder circuit 48 is coupled to the microword register 12 by means of the signal bus 34. Another input of the multiplexer 44 is coupled to bit stages 0–63 in the shifter high section 42H of the digit shifter 42 by means of a 64-line signal bus 50. An output of the multiplexer 44 is coupled to a 64-bit results register (RR) 51 by means of a signal bus 52. An output of the register 51 is coupled to port 2 of the decimal adder 40 and to bit stages 0–63 in the shifter high section 42H of the digit shifter 42 by means of a 64-line signal bus 53.

Shown in the upper left hand corner of FIG. 2 there are provided three registers (X1, X2, X3) 55, 56 and 57, respectively. The registers 55–57 are coupled to three inputs of a multiplexer 58 by means of three signal buses 59, 60 and 61. Another input of the multiplexer 58 is coupled to an output of a decoder 62 by means of a control signal bus 63. An input to the decoder 62 is coupled to the microword register 12 by means of the signal bus (W) 34. An output of the multiplexer 58 is coupled to a 64-bit AR register 65 by means of a signal bus 66.

An output of the AR register 65 is coupled to a 9's complement circuit 67 and an input of a multiplexer 68 by means of a signal bus 69. An output of the circuit 67 is coupled to another input of the multiplexer 68 by means of a signal bus 70. Another input of the multiplexer 68 is provided for receiving a trigger control signal C5 (next cycle 9's complement port 1 trigger) by means of a signal bus 71. An output of the multiplexer 68 is coupled to stages 0–63 of port 1 of the decimal adder 40 by means of a signal bus 72. The decimal adder is provided with an input for receiving a trigger control signal C6 (carry trigger) by means of a control signal bus 73.

Referring to the bit stages 0–63 of the low section 42L of the digit shifter 42, bit stages 0–55 are coupled to an input of a multiplexer 80 by means of a signal bus 81. Bit stages 56–59 of the low section 42L of the digit shifter 42 are coupled to an input of a multiplexer 82 by means of a signal bus 83. Bit stages 60–63 of the low section 42L of the digit shifter 42 are coupled to an input of a multiplexer 84 by means of a signal bus 85.

Referring to the multiplier register (MQR) 43, the output of bit stages 0–55 of the register 43 are coupled to an input of the multiplexer 80 by means of a signal bus 90. The output of bit stages 52–55 are coupled through a +1 digit incrementing circuit 91 to an input of the multiplexer 82 by means of a signal bus 92. The output of bit stages 56–59 of the register 43 is coupled to a D0>6 detecting circuit 93, a D0<4 or D0>6 detecting circuit 94, a D0=0 or D0>9 detecting circuit 95, an input of the decoder 62 and an input of the multiplexer 82 by means of a control signal bus 96. The output of bit stages 60–63 of the register 43 are coupled to an input of the multiplexer 84 by means of a signal bus 97. Another input of the multiplexer 82 is coupled to an output of a decoder 98 by means of a control signal bus 99. An output of a decoder 100 is coupled to inputs of the multiplexers 80 and 84 by means of a control signal bus 101. An output of the multiplexer 80 is coupled to inputs of the stages 0–55 of the register 43 by means of a bus 102. An output of the multiplexer 82 is coupled to inputs of the stages 56–59 of the register 43 by means of a signal bus 103. An output of the multiplexer 84 is coupled to inputs of the stages 60–63 of the register 43 by means of a signal bus 104.

In addition to the above-described inputs and outputs, the digit shifter 42 is further provided with an input for receiving a shift-right-one-digit-control signal from an SAR circuit 107 on a control signal bus 105 and an input for receiving a control signal C7 (product negative trigger) on a control signal bus 106.

An output of the D0>6 circuit 93 is coupled to an input of the decoder 98, an input of a multiplexer 110 and a multiplexer 111 by means of a control signal bus 112. An output of the D0<4 or D0>6 detecting circuit 94 is coupled to a latch 113 by means of a control signal line 114. An output of the latch 113 is provided for providing the trigger control signal C8 on the control signal line 36.

Coupled to the AND gate 143, an output of the D0=0 or >9 detecting circuit 95 is provided for providing a control signal C9 on a control signal bus 115. An output of the multiplexer 110 is coupled to an input of a latch 116 and a latch 117 by means of a control signal bus 118. The latch 116 is provided with an output for providing the trigger control signal C5 to the multiplexer 68 at an input of the adder 40 on the control signal line 71. The latch 117 is provided with an output for providing the trigger control signal C6 to the adder 40 on the control signal line 73. The multiplexer 110 is further provided with an input for receiving an output from a decoder 120 on a control signal bus 121 and an input coupled to a source of a binary zero 122 by means of a control signal bus 123. The multiplexer 111 is provided with an output coupled to a latch 125 by means of a control signal bus 126. Latch 125 is provided with an output for providing the trigger control signal C7 to the digit shifter 42 and an input of the multiplexer 111 by means of the control signal line 106.

An input of the decoder 100 is coupled to the microword register 12 by means of the signal bus 34. Similarly, an input of the decoder 98 is coupled to the microword register 12 by means of the signal bus 34. Stages 0–63 of the multiplier register 43 are coupled to inputs of stages 0–63 of the low section 42L of the shifter 42 by means of a signal bus 130.

Shown in FIG. 2 above the shifter 42, there is provided a multiplexer 131. An input of the multiplexer 131 is coupled to an output of a decoder 132 by means of a signal bus 133. An input of the decoder 132 is coupled to the microword register 12 by means of the signal bus 34. Another input of the multiplexer 131 is coupled to an initial loop count circuit 134 by means of a signal bus 135. An output of the multiplexer 131 is coupled to a loop counter 136 by means of a signal bus 137. An output of the loop counter 136 is coupled through a −1 digit decrementing circuit 138 to an input of the multiplexer 131 by means of a signal bus 139, to an equal-to-zero detecting circuit 140, and to a greater-than-zero detecting circuit 141 by means of a signal bus 142. The equal-to-zero detecting circuit 140 is provided with an output for providing the control signal Z on the control signal bus 37 coupled to the multiplexer 16 in the apparatus of FIG. 1. The greater-than-zero detecting circuit 141 is provided with an output coupled to an input of the AND gate 143 and an input of the decoder 98 by means of a control signal bus 144. The AND gate 143 is provided with another input for receiving the control signal C9 from the D0=0 or D0>9 detecting circuit 95 on the control signal line 115 and an input for receiving an output from a decoder 145 on a control signal line 146. The decoder 145 is provided with an input coupled to the microword register 12 by means of the control signal bus 34. The AND gate 143 is provided with an output for providing a control signal REPEAT to the AND gate 10 of the apparatus of FIG. 1 by means of a control signal bus 150. A second input of the AND gate 10 is provided for receiving a clock signal on a clock signal bus 151. As shown more clearly in FIG. 1, the output of the AND gate 10 is coupled to the AAR register 4, BAR register 5, the LAST-SELA register 13 and the microword register 12 by means of a clock signal bus 152.

The operation of the apparatus of FIGS. 1 and 2 will now be described in connection with the execution of an algorithm for performing a multiplication. As will become apparent, the advantage of the present invention is that cycles of operation may be saved when in the course of executing an algorithm or other machine operation, it is required or possible to execute the same microword in two or more successive machine cycles. As will be described below, in a typical multiplication it is possible to execute the same microword in two or more successive machine cycles whenever one or more digits of the multiplier is a zero.

Initially, microwords are stored in the control store A and the control store B. Each of the microwords stored in the control stores A and B comprise a control word and a branch address. The microword in control store A comprises an A control word and a B branch address. The microwords stored in control store B comprise a B control word and an A branch address. The address registers 4 and 5 are provided for addressing control store A and control store B, respectively. As a microword is read out of one of the control stores, the branch address associated therewith is transferred to the address register of the other control store. For example, as the control word in a microword is read out of control store A via bus 20 to one input of the MUX 11, the B branch address associated therewith is transferred to an input of the MUX 8. Similarly, as the control word in a microword is read out of control store B and transferred to the MUX 11 via the bus 22, the A branch address associated therewith is transferred to an input of the MUX 7. In practice, a microword is read out of both control store A and control store B simultaneously. Which of them is transferred to the microword register 12 depends on the control signal SELA on the bus 31. Assuming that control signal SELA is high, the microword from control store A will pass through MUX 11 to microword register 12. At the same time, the B branch address associated therewith will be transferred via MUX 8 under the control of the MUX control signal BAR SEL to the BAR address register 5. The microword transferred to the microword register 12 is then decoded via the bus 34 in the various decoding circuits in the apparatus and decoded for controlling the functional sub-units as will be further described below. It is, of course, understood that the functions of the several decoders described may be provided by a single decoder.

At the same time that the control signal SELA is generated, its value is latched into the LAST-SELA register 13. The output of the register 13 is provided as an input to the exclusive OR gate 14. In the absence of a BRANCH control signal on the bus 38, the output of the exclusive OR gate 14 will remain high to facilitate the transfer of successive control words from control store A to the microword register 12. As each address in the AAR address register 4 addresses a microword in the control store A, it is incremented in the incrementing circuit 6. The incremented address is then transferred through the MUX 7 under the control of the AAR SEL control signal to the AAR address register 4 to address the next microword in the control store A. As will be seen from FIG. 1, the latching of addresses in the address registers 4 and 5, the latching of the microwords into the microword register 12 and the latching of the last SELA signal in the register 13 are under the control of a clock signal on the clock signal bus 152.

Assuming that the last SELA control signal latched into the register 13 is a logical high when a branch signal is generated on the signal bus 38, the output of the OR gate 14 will go low, toggling the MUX 11 to transfer a microword located at the B branch address in the B control store 3 to the microword register 12. Thereafter, in successive machine cycles, B control words from the B control store 3 will be transferred to the microword register 12 and A branch addresses from the associated address fields will be transferred to the address register 4 until such time as the MUX 11 is toggled by another BRANCH signal generated on the control signal bus 38.

As will be further described below, the generation of a BRANCH control signal on the control signal bus 38 depends on the control signals C8 and Z and the output of the decoder 15 on the input lines 35-37 of the multiplexer 16.

Control words from control stores A and B will be transferred to the microword register 12 under the control of the BRANCH control signal on the control signal bus 38 in the manner described above until such time as a REPEAT control signal is generated on the control signal bus 150 at the input of the AND gate 10. When a REPEAT control signal is generated on the control signal bus 150 at the input of the AND gate 10, the AND gate 10 is disabled and clock pulses which are transmitted through the AND gate 10 from bus 151 to bus 152 are interrupted. In the absence of clock pulses on the clock signal bus 152, the contents of the address registers 4 and 5, the LAST-SELA register 13 and the microword register 12 will remain unchanged. However, since the REPEAT control signal interrupts the clock pulses to those registers only, all other functional sub-units in the apparatus will continue to operate in a normal manner, as will now be described.

Referring to the table in FIG. 3, the operation of the apparatus of FIG. 2 will now be described with respect to the multiplication of a multiplicand 121 and a multiplier 10,473 to obtain the product 1,267,233.

In the table of FIG. 3, there is provided a number of columns of numbers and latch status levels with respect to machine cycles of operation. Each of the numbers and status levels represent the condition of the registers indicated at the conclusion of the cycle indicated. The numbers under the column headed AR represent the contents of the AR register 65. The numbers under the column headed RR represent the contents of the results register 51. The numbers under the column headed MQR represent the contents of the multiplier register 43. The numbers under the column headed Loop Count represent the contents of the loop counter 136. The numbers under columns headed C5, C6, C7 and C8 represent the status of the latches 116, 117, 125 and 113, respectively.

In preparation for the multiplication operation, one or more control words are transferred to the microword register 12 and executed to initialize or set up the apparatus of FIG. 2. These steps include storing in X1 register 55 a number corresponding to the multiplicand 121, storing in X2 register 56 a number corresponding two times the multiplicand, i.e. 242, and storing in X3 register 57 a number corresponding to three times the multiplicand, i.e. 363, setting the results register 51 to zero by transmitting zeros from the source of zeros 46 through the multiplexer 44, placing an initial count in the loop counter 136 via the multiplexer 131 under the control of the decoder 132 wherein said initial loop count comprises a number equal to the number of digits in the multiplier excluding leading zero digits, i.e. 5, storing the multiplier, i.e. 10,473, in the multiplier register 43 and setting latches C5–C8 to logical zeros. It should be noted that for convenience, the sign of the multiplier, in this case zero, is stored in stages 60–63 of the multiplier register 43. The least significant digit of the multiplier is stored in stages 56–59. The next least significant digit of the multiplier is stored in stages 52–55, etc., with the most significant digit of the multiplier stored in stages 0–3 of the multiplier register 43. In this regard, it should be noted that each of the digits and the sign stored in the register 43 comprises four bits. Also, it should be noted that while latches 116, 117 and 113 are set to zero for convenience, it is only necessary that latch 125 be set to a logical zero level during the setup.

After the setup is completed, the multiplication operation is commenced. Depending on the value of the digits in the multiplier, the multiplication operation will comprise successive sets of one, two or three machine cycles. The operations which are executed in each of the cycles are listed in the program listing in FIG. 4.

At the end of the setup, the operations in cycle 1 listed in FIG. 4 are performed. In cycle 1, the contents of RR register 51 are transferred to shifter high 42H stages 0–63, shifted one digit to the right and transferred to the results register 51. Because the least significant digit of the multiplier comprises a 3, the contents of X3 register 57, i.e. 363, are transferred to the AR register 65. It will be noted that in cycle 1 the digit being tested in the multiplier will always be shifted to the least significant digit position and, for convenience, is hereinafter referred to as DO. Because DO is less than 6, triggers C5–C7 are reset to 0. Because DO is less than 6 and the loop count is greater than 0, the contents of MQR are transferred to the shifter 42, shifted one digit to the right and transferred back to MQR stages 0–63 causing the multiplier in MQR to be shifted one digit to the right placing the number 7 in the digit DO position. The loop count is decremented and a control signal for a shift right one digit is sent to the SAR register 107. Since DO is neither a 4, 5 or 6, trigger C8 (bypass third cycle trigger) is set to a 1. Since the loop count is not a 0 and DO is neither 0 nor greater than 9, the operation continues to the next microword, entering cycle 2. It should also be noted that, while referred to herein separately, in cycle 1, the contents of both the high and low sections of the shifter 42 are shifted in unison such that the least significant digit in the high section is shifted into the most significant digit position in the low section and the least significant digit is discarded in the sign position.

In cycle 2, the contents, i.e. 363, of the AR register 65 and the contents, i.e. 000..00, of the results register 51 are added and returned to the results register 51. Three times the multiplicand is transferred to the AR register 65. A control signal requiring a shift right one digit in cycle 1 is sent to the SAR register 107, trigger C7 is held, triggers C5 and C6 are reset and trigger C8, which was set in cycle 1, is tested. Since trigger C8 was set in cycle 1, the operation branches to cycle 1.

In practice, if cycle 1 and cycle 2 resulted from an execution of control words from control store A, the branch to cycle 1 will result in the execution of corresponding control words from control store B. Accordingly, the list of operations in cycles 1, 2 and 3 described above are equally applicable to microwords from either control store A or control store B.

In the second execution of the cycle 1 operations, the contents of results register 51 are again transferred to shifter 42, shifted, and transferred back to the results register 51. This results in the number 36 appearing in the results register 51 and the number 3 previously in the results register 51 being transferred to the most significant digit stage, stage 0, of the shifter low. Since DO in the MQR register 43 is now a 7 as a result of the shift in the previous cycle 1, the contents of X3 register 57 are transferred to the AR register 65, triggers C5, C6 and C7 are set, the contents of shifter low stages 0–63 are transferred to the MQR register 43, with the exception that the digit in MQR stages 52–55 is incremented and transferred to MQR stages 56–59 which accounts for the number 4 in the previous cycle 2 becoming a 5 in the current cycle 1. At the same time, the loop counter 136 is decremented and since DO is a 7, trigger C8 is set. Since the loop count at the end of the previous cycle 2 was a 4 and digit DO was a 7, the operation continues to the next microword, i.e. the second cycle 2.

Once again, the contents of the AR register 65 and the results register 51 are added. However, because triggers C5–C7 had been set in the previous cycle 1, the number transferred to the results register 51 comprises the sum of the previous contents of the results register 51 incremented by 1 and the 9's complement of the contents of the AR register 65, i.e. the number 99..9673. As in the previous cycle 2, a number equal to three times the multiplicand, 363, is transferred to the AR register 65. A control signal requiring a shift right one digit is sent to the SAR register 107, trigger C7 is held and triggers C5 and C6 are reset. Since trigger C8 was set in the previous cycle 1, the operation branches to another cycle 1.

In the third execution of cycle 1, the contents of the RR register 51 are transferred to the shifter 42, shifted, and transferred back to the results register 51. However, since trigger C7 was held in the previous cycle 2, a 9 is transferred into the most significant digit position thereof. The least significant digit 3 from the results register is transferred to the most significant digit position of the shifter low and thence to the MQR register 43. Since the digit DO at the end of the previous cycle 2 was a 5, the contents of X2 register 56 are transferred to the AR register 65, i.e. 242. The loop counter is decremented and the triggers C5–C8 are reset. Since DO is neither a 0 or a number greater than 9, the operation proceeds to the next microword, i.e. cycle 2.

In cycle 2, the contents of the AR register 65 and results register 51 are added and returned to the results register 51 and three times the multiplicand is transferred to the AR register 65. A control signal requiring a shift right one digit is sent to the SAR register 107, the trigger C7 is held and triggers C5 and C6 are reset. Since trigger C8 was reset in cycle 1, the operation proceeds to the next microword in cycle 3.

In cycle 3, the contents of the AR register 65 and the results register 51 are added. A control signal requiring a shift right one digit is sent to the SAR register 107. Triggers C5 and C6 are reset and trigger C7 is held. Thereafter, the operation proceeds to the next microword which is a branch to cycle 1.

As described above, in this execution of cycle 1, the contents of the results register 51 and the MQR register 43 are shifted one digit to the right. The loop count is decremented. The triggers C5–C7 are reset and trigger C8 is set. However, unlike the previously described operations in cycle 1, the fact that D0 equals a 0 causes the apparatus of FIG. 2, namely, the circuit 95, to generate a control signal C9 which in turn generates a REPEAT control signal on the signal bus 150. The generation of the REPEAT control signal on the signal bus 150 disables the clock signal to the AAR register 4, the BAR register 152, the LAST-SELA register 13 and the microword register 12, thereby forcing the re-execution of the current microword in the microword register 12 and hence the re-execution of cycle 1.

In the re-execution of cycle 1, the contents of RR register 51 are transferred to shifter 42, shifted, and transferred back to the results register 51. The contents of the MQR register 43 are shifted one digit to the right. Since the digit D0 in the previous cycle 1 is a 1, the contents of the X1 register 55 are transferred to the AR register 65. The loop counter is decremented, triggers C5–C7 are reset and trigger C8 is set. As described above, the operation then proceeds to cycle 2.

In cycle 2 the contents of the AR register 65 and results register 51 are added and the sum thereof stored in results register 51. Trigger C7 is held and triggers C5 and C6 are reset. Since trigger C8 was set in the previous cycle 1, the operation continues by branching to another cycle 1. In this, the last cycle because the loop counter 136 has been decremented to zero, the contents of the results register 51 and the MQR register 43 are shifted one digit to the right. The loop counter is decremented to a −1, the triggers C5–C7 are reset and trigger C8 is set. Since the loop count in the previous cycle was 0, the operation now branches to finishing cycles (not shown) with the result of the multiplication appearing partially in the results register 51 and the MQR register 43.

While an embodiment of the present invention is described above with respect to a multiplication operation, it is contemplated that various changes may be made thereto without departing from the spirit and scope of the present invention. For example, any operation which requires, or can be arranged to require, the execution of a given control word in two or more successive cycles will benefit from the savings in machine cycles which result from the present invention. Moreover, these savings are achieved with no significant increase in the amount of apparatus required. Accordingly, it is intended that the above description of the present invention be considered only as illustrative and that the scope of the invention be not limited thereto but be determined by reference to the claims hereinafter provided.

What is claimed is:

1. A microword controlled computer system, for performing a pseudo branch comprising:
   a first control store;
   a second control store;
   a first address register for addressing said first control store;
   a second address register for addressing said second control store;
   a microword register;
   a multiplexer responsive to a first control signal (SELA) having a first and a second value for selectively transferring a microword from said first or said second control store to said microword register in successive cycles, respectively;
   a register for providing a second control signal (LAST-SELA) corresponding to the value of said first control signal SELA in a previous cycle;
   an exclusive OR gate responsive to said second control signal (LAST-SELA) and a third control signal (BRANCH) for providing said first control signal (SELA);
   means in each of said first and second address registers, said microword register and said second control signal providing register which is responsive to a clock signal for latching data into said registers;
   means responsive to an algorithm being executed in said computer system that requires that a current microword being executed in a cycle be re-executed in a following cycle for generating a fourth control signal (REPEAT); and
   means responsive to said fourth control signal (REPEAT) and said clock signal for inhibiting said clock signal and thereby preventing a change in said registers until said current microword has been re-executed.

2. A microword controlled computer system for performing a pseudo branch comprising:
   a microword register;
   N control stores;
   means for selectively transferring a microword from one of said N control stores to said microword register;
   means coupled to said microword register for executing each microword in said microword register; and
   means for branching to N+1 targets wherein each one of N of said N+1 targets comprises a microword from one of said N control stores and one of said N+1 targets is a current microword in said microword register.

3. A system according to claim 2 wherein said branching means comprises means for holding a microword in said microword register for at least two successive cycles of operation of said system.

4. A microword controlled computer system having a plurality of cycles of operation for performing a pseudo branch comprising:
   a microword register;
   N control stores for storing a plurality of microwords;
   means for transferring a selected microword from one of said N control stores to said microword register during one of said plurality of cycles of operation of said system;
   means responsive to an algorithm that requires successive executions of said selected microword for generating a control signal (REPEAT); and
   means responsive to said control signal (REPEAT) for inhibiting said transferring means for at least a predetermined one of said plurality of cycles of operation to thereby cause the execution of said selected microword in said microword register.

5. A system according to claim 4 wherein said control signal generating means comprises:
   means for multiplying a multiplicand and a multiplier in successive cycles of operation of said system, said multiplier comprising a plurality of digits, each of said digits having a numerical value;
   means for detecting the numerical value of a predetermined digit in said multiplier during each one of said successive cycles of operation of said system; and means responsive to said detecting means for generating said control signal (REPEAT) when said numerical value of said predetermined digit has a predetermined numerical value.

6. A system according to claim 5 wherein said predetermined numerical value of said predetermined digit comprises zero or a binary-coded decimal number greater than 9.

7. A system according to claim 4 wherein said control signal (REPEAT) comprises a first control signal (REPEAT) and said control signal generating means comprises:
  means for multiplying a multiplicand and a multiplier in successive cycles of operation of said system, said multiplying means comprising a counter for containing a number corresponding to the number of digits in said multiplier excluding leading zero digits in the most significant digit positions thereof and means for decrementing said counter in each one of said successive cycles, each of said digits having a numerical value;
  means for providing a second control signal (greater than 0) when said number in said counter is greater than 0;
  means for detecting the numerical value of a predetermined digit in said multiplier during each one of said successive cycles of operation of said system;
  means responsive to said detecting means for generating a third control signal (0 or greater than 9) when said numerical value of said predetermined digit is 0 or greater than the binary-coded decimal number 9; and
  means responsive to said second and said third control signals for generating said first control signal (REPEAT).

8. A method of performing a pseudo branch in a microword controlled computer system, comprising the steps of:
  providing a first control store;
  providing a second control store;
  addressing a microword in said first control store;
  addressing a microword in said second control store;
  providing a microword register;
  selectively transferring in response to a first control signal (SELA) having a first and a second value a microword from said first or said second control store to said microword register in successive cycles, respectively;
  providing a second control signal (LAST-SELA) corresponding to the value of said first control signal SELA in a previous cycle;
  providing said first control signal (SELA) in response to said second control signal (LAST SELA) and a third control signal (BRANCH);
  latching data into said register in response to a clock signal;
  generating a fourth control signal (REPEAT) in response to an algorithm being executed in said computer system that requires that a current microword being executed in a cycle be re-executed in a following cycle; and
  inhibiting said clock signal and thereby preventing a change in said registers prior to executing said current microword in response to said fourth control signal (REPEAT) and said clock signal.

9. A method of performing a pseudo branch in a selected microword in a microword register of a microword controlled computer system, comprising the steps of:
  providing a microword register;
  providing a control stores;
  transferring a microword from one of said N control stores to said microword register;
  executing each microword in said microword register; and
  branching to N+1 targets wherein each one of N of said N+1 targets comprises a microword from one of said N control stores and one of said N+1 targets is a current microword in said microword register.

10. A method according to claim 9 wherein said branching step comprises the step of holding a microword in said microword register for at least two successive cycles of operation of said system.

11. A method of performing a pseudo branch in a microword controlled computer system having a plurality of cycles of operation, comprising the steps of:
  providing a microword register;
  providing N control stores for storing a plurality of microwords;
  transferring a microword from one of said N control stores to said microword register;
  generating a control signal (REPEAT) in response to an execution of an algorithm that requires successive executions of said selected microword; and
  inhibiting said transferring step for at least a predetermined one of said cycles of operation thereby permitting a re-execution of a microword in said microword register in response to said control signal (REPEAT).

12. A method according to claim 11 wherein said control signal generating step comprises the steps of:
  multiplying a multiplicand and a multiplier in successive cycles of operation of said system, said multiplier comprising a plurality of digits, each of said digits having a numerical value;
  detecting the numerical value of a predetermined digit in said multiplier during each one of said successive cycles of operation of said system; and
  generating said control signal (REPEAT) in response to said detecting step when said numerical value of said predetermined digit has a predetermined numerical value.

13. A method according to claim 12 wherein said predetermined numerical value of said predetermined digit comprises zero or a binary-coded decimal number greater than 9.

14. A method according to claim 11 wherein said control signal (REPEAT) comprises a first control signal (REPEAT) and said control signal generating step comprises the steps of:
  multiplying a multiplicand and a multiplier in successive cycles of operation of said system, said multiplier comprising a plurality of digits, each of said digits having a numerical value, said multiplying step comprising the step of providing in a counter a number corresponding to the number of digits in said multiplier excluding leading zero digits and decrementing said counter in each one of said successive cycles;
  providing a second control signal (greater than 0) when said number in said counter is greater than 0;
  detecting the numerical value of a predetermined digit in said multiplier during each one of said successive cycles of operation of said system;
  generating in response to said detecting step a third control signal (0 or greater than 9) when said numerical value of said predetermined digit is 0 or greater than a binary-coded decimal number 9; and
  generating in response to said second and said third control signals said first control signal (REPEAT).

* * * * *